US011653658B2

(12) United States Patent
Bolzacchini et al.

(10) Patent No.: US 11,653,658 B2
(45) Date of Patent: May 23, 2023

(54) APPARATUS AND METHOD FOR SMOKING FOOD PRODUCTS

(71) Applicants: INOX MECCANICA—S.R.L., Frazione Solarolo (IT); LANDWEHR SERVICE GMBH, Versmold (DE)

(72) Inventors: Giovanni Bolzacchini, Desenzano Del Garda (IT); Holger Landwehr, Bad Rothenfelde (DE)

(73) Assignees: INOX MECCANICA-S.R.L., Goito (IT); LANDWEHR SERVICE GMBH, Versmold (DE)

( * ) Notice: Subject to any disclaimer, the term of this patent is extended or adjusted under 35 U.S.C. 154(b) by 497 days.

(21) Appl. No.: 16/790,096

(22) Filed: Feb. 13, 2020

(65) Prior Publication Data

US 2020/0260747 A1 Aug. 20, 2020

(30) Foreign Application Priority Data

Feb. 15, 2019 (IT) ........................ 102019000002207

(51) Int. Cl.
*A23B 4/044* (2006.01)
*A23B 4/052* (2006.01)
*A23L 5/10* (2016.01)

(52) U.S. Cl.
CPC .............. *A23B 4/052* (2013.01); *A23B 4/044* (2013.01); *A23L 5/17* (2016.08)

(58) Field of Classification Search
CPC ........................ A23B 4/044–4/056; A23L 5/17
See application file for complete search history.

(56) References Cited

U.S. PATENT DOCUMENTS

| 354,072 | A | * | 12/1886 | Ryan | |
|---|---|---|---|---|---|
| 2,123,040 | A | * | 7/1938 | Hanak | A23B 4/052 99/421 V |
| 2,158,341 | A | * | 5/1939 | Thau | A23B 4/052 99/421 H |
| 2,562,713 | A | * | 7/1951 | Harrison | A47J 37/047 99/443 R |
| 3,316,831 | A | * | 5/1967 | Koland | A23B 4/052 99/402 |

(Continued)

FOREIGN PATENT DOCUMENTS

EP 1082905 A1 * 3/2001 ............. A22C 9/005

OTHER PUBLICATIONS

Database FSTA [Online] International Food Information Service (IFIS), Frankfurt-Main, DE; "Charcoal smoke-far infrared ray radiating oven.", XP002792094, Database accession No. FS-2014-04-Sv4773 ;

United States Patent 2013, Jan. 10, 2014 (Jan. 10, 2014), Dae-Hee Han, Gwangju-Si, Korea (Abstract Only).

(Continued)

*Primary Examiner* — Drew E Becker
(74) *Attorney, Agent, or Firm* — Scully, Scott, Murphy & Presser, P.C.

(57) ABSTRACT

An apparatus for smoking food products, comprising at least one kiln which is provided with a drum, which can be actuated so as to rotate about its own axis of extension, and which defines internally a treatment chamber for food products which can be accessed through a loading and unloading opening. The drum has at least one smoke inlet which is connected to a smoke generator device.

6 Claims, 5 Drawing Sheets

(56) References Cited

U.S. PATENT DOCUMENTS

| | | | | |
|---|---|---|---|---|
| 4,070,958 | A * | 1/1978 | Canright | A47J 37/046 99/468 |
| 4,309,938 | A * | 1/1982 | Harmon | B65G 37/00 198/603 |
| 4,446,779 | A * | 5/1984 | Hubbard | B01F 29/20 366/144 |
| 4,458,586 | A * | 7/1984 | Reed | A23B 4/12 118/19 |
| 4,549,476 | A * | 10/1985 | Langen | A47J 37/047 99/441 |
| 4,669,447 | A | 6/1987 | Kelly | |
| 5,368,872 | A * | 11/1994 | Davis, Jr. | A23B 4/052 99/473 |
| 5,603,567 | A * | 2/1997 | Peacock | B01F 33/70 366/147 |
| 5,767,487 | A * | 6/1998 | Tippmann | A23L 5/13 426/241 |
| 5,967,027 | A * | 10/1999 | Higashimoto | A23B 4/044 99/534 |
| 6,068,874 | A * | 5/2000 | Grocholski | A23B 4/031 426/465 |
| 6,105,490 | A * | 8/2000 | Horn | B01F 35/95 366/147 |
| 6,868,777 | B1 * | 3/2005 | Higgins | A23B 4/044 426/314 |
| 7,469,630 | B1 * | 12/2008 | Ray | A23B 4/052 99/482 |
| 7,755,005 | B2 * | 7/2010 | Bartelick | F24C 15/164 219/401 |
| 2006/0112837 | A1 * | 6/2006 | Gabrielle | A47J 37/042 99/419 |
| 2007/0028782 | A1 * | 2/2007 | Chiu | A23B 4/044 99/482 |
| 2011/0247505 | A1 * | 10/2011 | Davis | A23B 4/052 99/472 |
| 2011/0293817 | A1 * | 12/2011 | Hurm | A23L 13/72 426/641 |
| 2012/0040061 | A1 * | 2/2012 | Caputi | A23B 4/044 426/235 |
| 2016/0193266 | A1 * | 7/2016 | Ablett | B65B 25/001 53/427 |
| 2017/0215638 | A1 * | 8/2017 | Markussen | A47J 37/0786 |
| 2019/0174778 | A1 * | 6/2019 | Van Dorn | A23L 3/0155 |
| 2019/0335774 | A1 * | 11/2019 | Garces | A23L 5/17 |
| 2020/0120943 | A1 * | 4/2020 | Kobussen | A22C 11/006 |

OTHER PUBLICATIONS

Database Biosis [Online] Biosciences Information Service, Philadelphia, PA, US; Oct. 31, 2006 (Oct. 31, 2006), Anonymous: "Compact smoking oven with a rotatable food support", XP002792095, Database accession No. PREV200700064971 (Abstract Only).

Italian Search Report dated Jun. 14, 2019 issued in IT 102019000002207, with partial translation.

* cited by examiner

APPARATUS AND METHOD FOR SMOKING FOOD PRODUCTS

BACKGROUND OF THE DISCLOSURE

The present invention relates to an apparatus and a method for smoking food products.

As is known, the smoking of food products is typically carried out, at the industrial level, in apparatuses constituted by kilns that have a smoking chamber, in which the food products can be placed, usually hung from wheeled frames. The smoking chamber is connected to a smoke generator, which is typically provided by a brazier that produces a fire with a low flame and a large quantity of smoke which is sent into the smoking chamber.

The drawback of conventional smoking apparatuses is the considerable carbonaceous deposits on the food products.

Furthermore, conventional apparatuses do not make it possible to obtain an optimal penetration of the smoke inside the food product.

SUMMARY OF THE DISCLOSURE

The aim of the present invention is to provide an apparatus and a method for smoking food products that are capable of improving the known art in one or more of the above mentioned aspects.

Within this aim, an object of the invention is to provide an apparatus and a method for smoking food products that make it possible to obtain an optimal penetration of the smoke into the food products.

Another object of the invention is to provide an apparatus and a method for smoking food products that make it possible to limit the quantity of carbonaceous deposits on the food products.

Another object of the present invention is to provide an apparatus and a method for smoking food products that make it possible to obtain smoked food products without an excessive loss of weight of the food products themselves.

Another object of the present invention is to provide an apparatus and a method for smoking food products that make it possible to achieve a higher level of productivity with respect to the known art.

Another object of the present invention is to provide an apparatus for smoking food products that is capable of offering the widest guarantees of reliability and safety in operation.

Another object of the invention is to provide an apparatus for smoking food products that can be easily implemented using elements and materials that are readily available and which, furthermore, is structurally simple, so as to be also competitive from a purely economic viewpoint. This aim and these and other objects which will become better apparent hereinafter are achieved by the disclosed apparatus.

BRIEF SUMMARY OF THE SEVERAL VIEWS OF THE DRAWINGS

Further characteristics and advantages of the invention will become better apparent from the description of preferred, but not exclusive, embodiments of the apparatus according to the invention, illustrated by way of non-limiting example in the accompanying drawings wherein.

DETAILED DESCRIPTION OF THE DISCLOSURE

Figure 1:
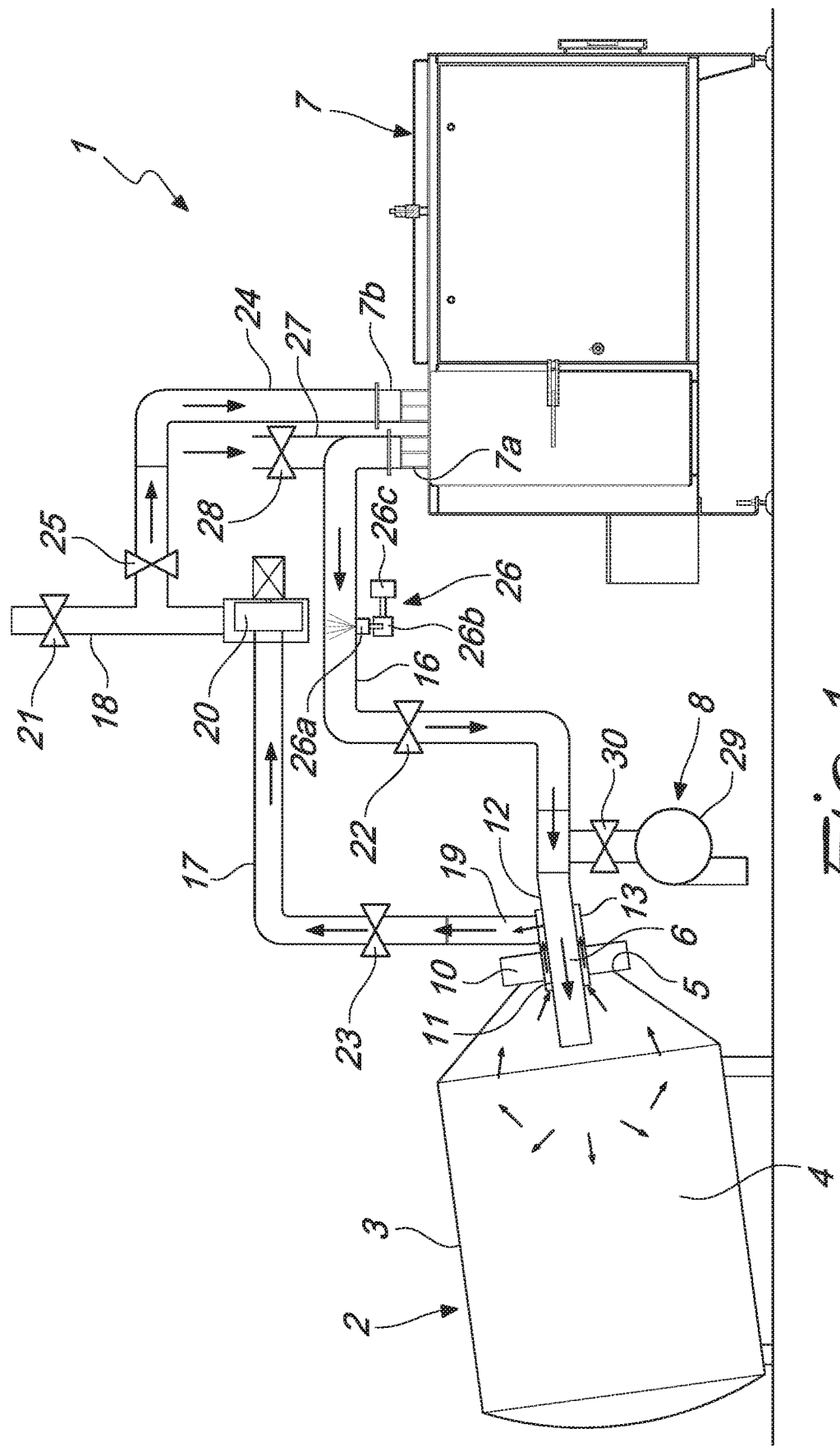
FIG. 1 is a schematic diagram of the apparatus according to the invention.
Figure 2:
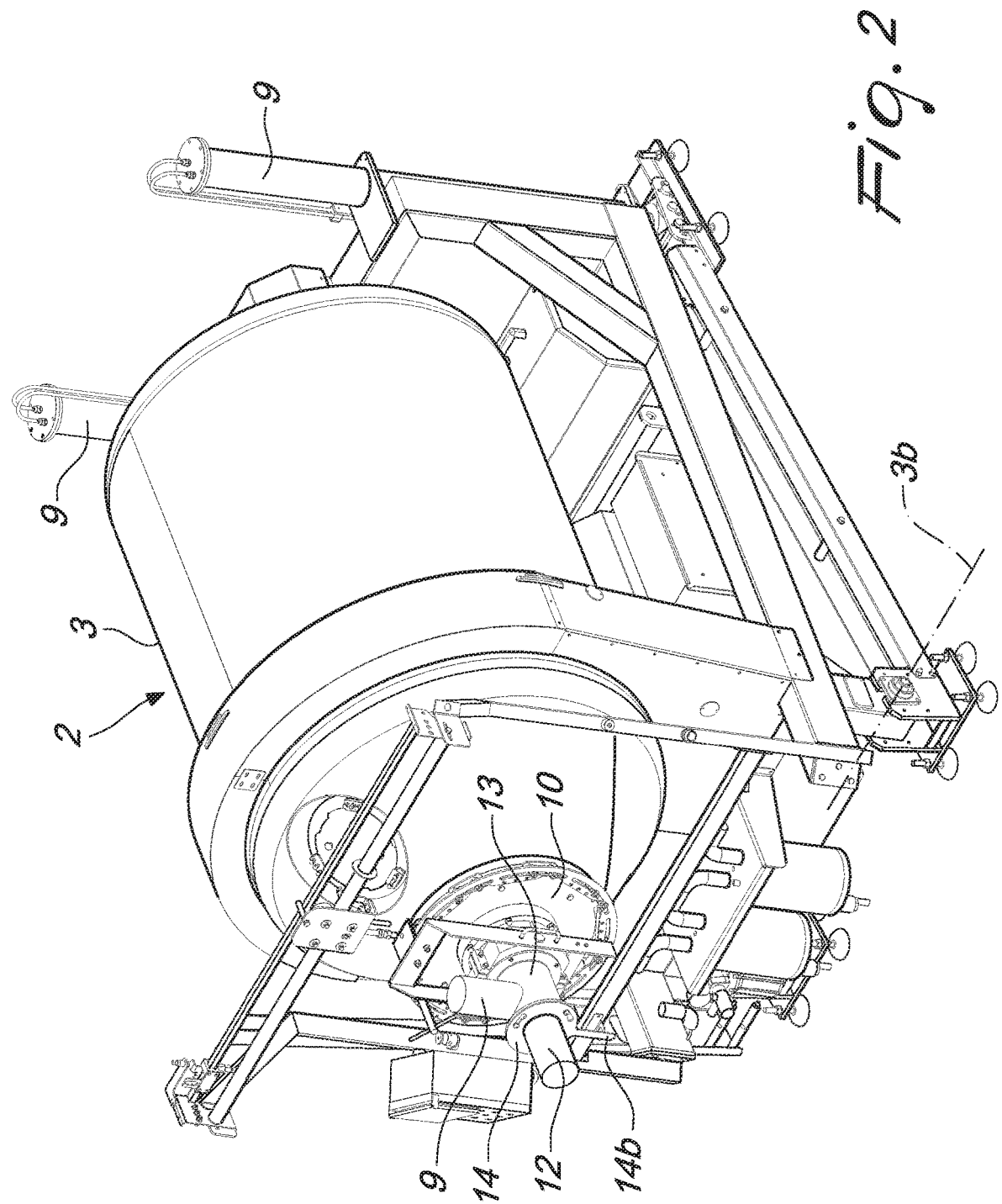
FIG. 2 is a perspective view of a kiln of the apparatus according to the invention.
Figure 3:
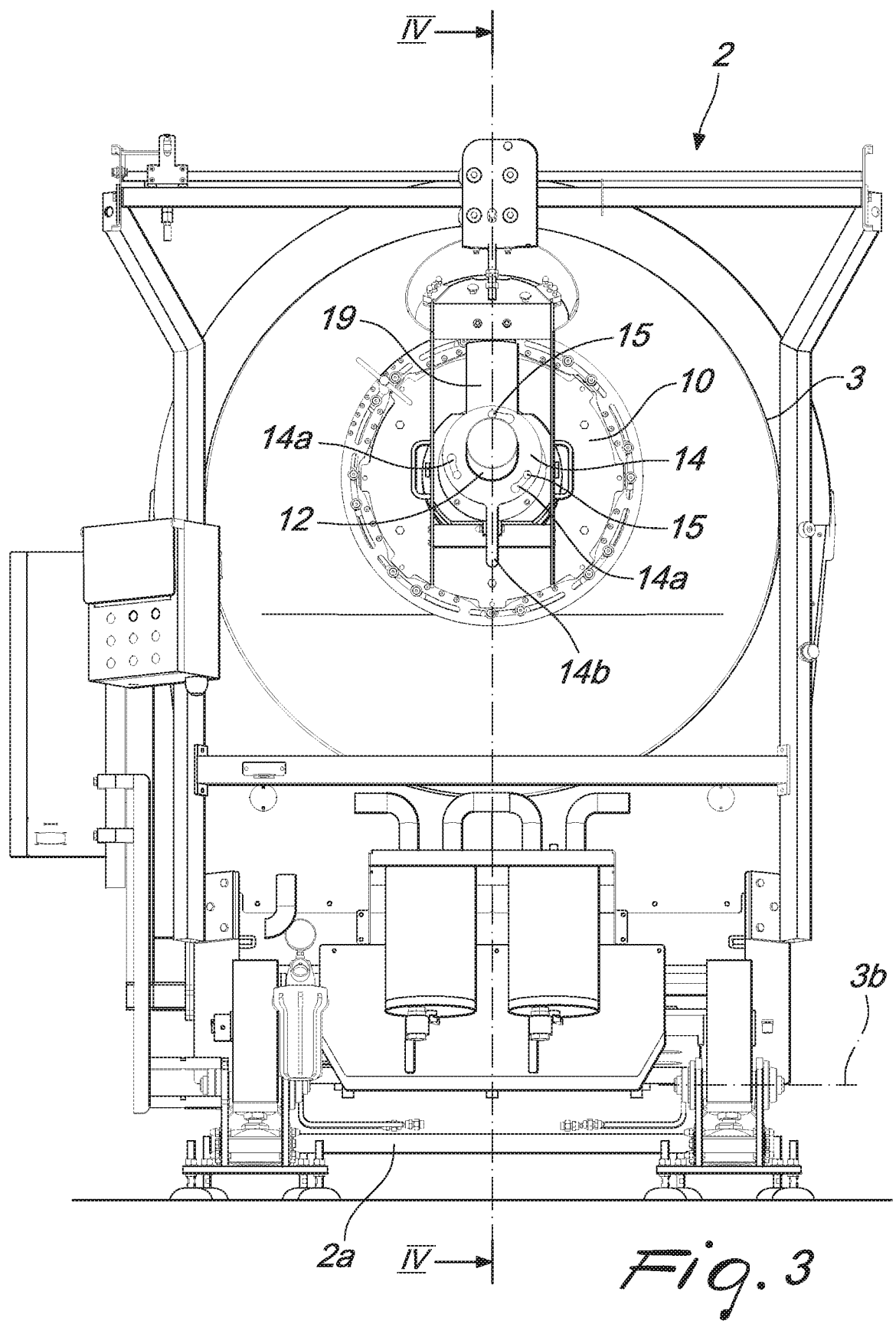
FIG. 3 is a front elevation view of the kiln in FIG. 2.
Figure 4:
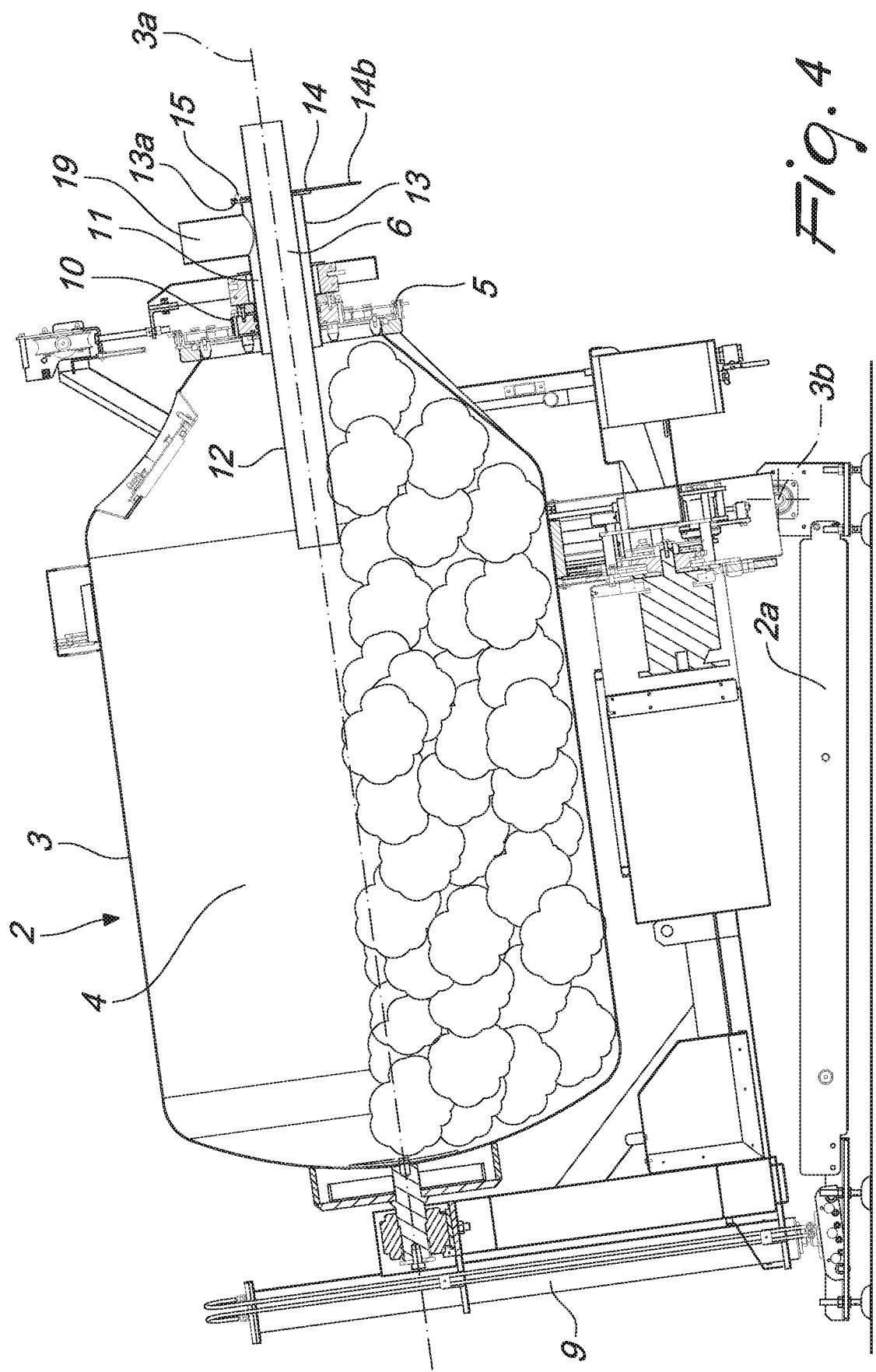
FIG. 4 is a cross-sectional view taken along the line IV-IV in FIG. 3.

With reference to the figures, the apparatus for smoking food products according to the invention, generally designated by the reference numeral 1, comprises at least one kiln 2 which is provided with a drum 3 with a substantially cylindrical shape structure, which can be actuated so as to rotate about its own axis of extension 3a and which defines, internally, a treatment chamber 4 for food products, which can be accessed through a loading and unloading opening 5 which is advantageously arranged at one end of the drum 3 and is substantially coaxial to the axis of extension 3a of the drum 3.

The drum 3 of the kiln has, also according to the invention, at least one smoke inlet 6 for introducing smoke into the treatment chamber 4, which is connected to a smoke generator device 7.

Advantageously, the treatment chamber 4 can further be connected to vacuum generation means 8, which are better described below.

In more detail, the drum 3 of the kiln 2 can be conveniently mounted so that it can oscillate on a footing 2a, about a rotation axis 3b that is substantially horizontal and substantially perpendicular to its axis of extension 3a, in order to allow the possibility of varying its inclination with respect to the horizontal, as a result of, for example, the actuation of piston actuators 9 which act between the drum 3 and the footing 2a.

Advantageously, the kiln 2 has a removable closure hatch 10 for the opening 5 of the drum 3, which can be removably connected to the opening 5 of the drum 3, conveniently by way of rotatable connection means, in order to allow the removable closure hatch 10, which is advantageously connected to the footing 2a of the kiln 2, to carry out the closing of the opening 5, while remaining in a fixed position with respect to the footing 2a of the kiln 2, even while the drum 3 is being actuated in rotation about its own axis of extension 3a.

Conveniently, the smoke inlet 6 is defined in the removable closure hatch 10, preferably in a zone arranged substantially at the axis of extension 3a of the drum 3.

Advantageously, the drum 3 is further provided with at least one outlet 11 for the smoke to exit from the treatment chamber 4, which is defined, preferably, around the inlet 6.

In more detail, an intake duct 12 is associated with the inlet 6, passes through the removable closure hatch 10, and extends, with at least a portion thereof, inward into the treatment chamber 4, preferably in axial alignment with the axis of extension 3a of the drum 3, while an outflow duct 13 is, in turn, associated with the outlet 11 and is arranged coaxially around the intake duct 12.

Conveniently, the outflow duct 13 is fixed to the removable closure hatch 10, while the intake duct 12 can be connected to the outflow duct 13 by way of means for removable coupling, which are constituted for example by a flange 14, which extends radially from the external surface of an intermediate portion of the intake duct 12 and can be rested against a wall 13a of the outflow duct 13 which is arranged transversely to the axis of the outflow duct 13, at an axial end thereof arranged outside the treatment chamber 4, and passed through axially by an insertion opening for the intake duct 12.

In particular, the flange 14 is provided with contoured openings 14a, which have a widened zone and a narrowed zone which are mutually connected and are distributed along its perimeter, and which can be engaged by coupling pins 15, arranged on the wall 13a, by way of the axial insertion of the coupling pins 15 into the widened zones of the contoured openings 14a and subsequent rotation of the flange 14 about its own axis, for example manually executable by way of a lever 14b, which protrudes radially from the flange 14, in order to enable the coupling pins 15 to engage the narrowed zones of the contoured openings 14a, so as to achieve the coupling of the flange 14 to the wall 13a with locking of the intake duct 12 to the outflow duct 13 and, therefore, to the removable closure hatch 10.

Preferably, the smoke generator device 7 is of the type with friction, so as to be capable of producing what is called "cold smoke", generated by friction, in a manner that is known per se, from at least one rotating friction wheel, not shown, against which a trunk of wood is pushed by pushing means, also not shown.

Conveniently, the smoke generator device 7 has an exit connector 7a for the smoke which is connected to the intake duct 12 by way of a delivery duct 16, while the outflow duct 13 of the smoke from the treatment chamber 4 of the drum 3 is, in turn, connected to a discharge duct 17, which is connected to a smoke evacuation duct 18 for evacuating the smoke into the outside environment.

Conveniently, the outflow duct 13 is connected to the discharge duct 17 by way of a connecting duct 19 which is fixed radially to the outflow duct 13.

Advantageously, the smoke flowing out from the exit connector 7a of the smoke generator device 7 is made to flow into the delivery duct 16 toward the treatment chamber 4 and from the treatment chamber 4 to the discharge duct 17 by circulation means, which are, for example, constituted by a fan 20 which is interposed, conveniently, along the discharge duct 17.

Advantageously, a first flow adjustment modulating valve 21 is interposed along the evacuation duct 18, and makes it possible to adjust the flow-rate of the smoke that passes through the evacuation duct 18 toward the outside environment.

Conveniently, a first flow control valve 22 is interposed along the delivery duct 16 and makes it possible to cut the connection between the smoke generator device 7 and the treatment chamber 4, while a second flow control valve 23 is interposed along the discharge duct 17, preferably arranged between the outflow duct 13 and the fan 20, and, in turn, makes it possible to close the connection of the treatment chamber 4 with the evacuation duct 18 and, therefore, with the outside environment.

Conveniently, in order to allow a recirculation of at least a part of the smoke between the treatment chamber 4 and the smoke generator device 7, in the smoke generator device 7 there is an intake connector 7b which is connected to the evacuation duct 18 by way of a connecting duct 24, along which a second flow adjustment modulating valve 25 is interposed.

Advantageously, a steam injection device 26 can optionally be connected to the delivery duct 16, and is constituted, for example, by a nozzle 26a which is connected, by way of the interposition of an admittance valve 26b, to a steam production assembly 26c, which is conventional per se, in order to allow the possibility of introducing a mixture of smoke and steam into the treatment chamber 4.

Conveniently, the delivery duct 16 is connected, preferably between the delivery connector 7a of the smoke generator device 7 and the first flow control valve 22, to an air intake duct 27 for air to enter from the outside environment, which is controlled by a third flow control valve 28.

It must likewise be added that, preferably, the above mentioned vacuum generation means 8 comprise a vacuum pump 29, which can be connected, preferably by way of the interposition of an intake valve 30, to the intake duct 12. More specifically, the vacuum pump 29 is connected to the delivery duct 16 between the first flow control valve 22 and the intake duct 12.

Operation of the apparatus according to the invention is the following.

The food products to be smoked are loaded into the treatment chamber 4 of the drum 3 of the kiln 2, through the opening 5, which is subsequently closed by way of the removable closure hatch 10.

With the delivery duct 16 connected to the intake duct 12 and the discharge duct 17 connected to the outflow duct 13, the first and second flow control valves 22 and 23 are opened, the third flow control valve 28 is closed and the smoke generator device 7 and the fan 20 are activated, so as to permit the introduction of smoke into the treatment chamber 4, so as to begin the smoking of the food products.

Then, the drum 3 is placed in rotation at a preset speed and the flow of smoke transiting from the smoke generator device 7 to the evacuation duct 18 is regulated using the first and second flow adjusting modulating valves 21 and 25.

In this step, the drum 3 of the kiln 2 can be positioned with its axis of extension 3a arranged substantially horizontally.

Optionally, the steam injection device 26 can also be activated, if it is desired to use damp smoke for smoking the food products.

Once a preset length of time has passed, a step is begun of evacuating the smoke from the treatment chamber 4 which entails initially, while keeping the drum 3 of the kiln 2 in rotation, opening the third flow control valve 28 and, after a preset time interval after opening the third flow control valve 28, for example about two minutes, subsequently closing the second flow adjusting modulating valve 25 and fully opening the first flow adjusting modulating valve 21, so as to send air into the treatment chamber 4, so pushing the smoke remaining inside it toward the evacuation duct 18.

Also in the step of evacuating the smoke from treatment chamber 4, the drum 3 of the kiln 2 can be positioned with its axis of extension 3a arranged substantially horizontally.

Once the smoke is fully evacuated from the treatment chamber 4, a step can be performed of creating a vacuum in the treatment chamber 4, which entails closing the first and second flow control valves 22 and 23 and opening the intake valve 30 together with activation of the vacuum pump 29.

In this step, the drum 3 can be positioned with its axis of extension 3a arranged in any angular position about the rotation axis 3b.

Once a preset length of time has passed, the vacuum pump 29 can be deactivated and the intake valve 30 can be closed and, after having opened the first flow control valve 22, in order to allow air to enter the treatment chamber 4, the removable closure hatch 10 can be opened, after separating the delivery duct 16 from the intake duct 12 and the discharge duct 17 from the outflow duct 13, so as to allow the food products to be unloaded from the treatment chamber 4 through the opening 5.

In practice it has been found that the invention fully achieves the intended aim and objects and, in particular, it should be noted that, by virtue of the apparatus according to the invention, it is possible not only to increase productivity, with respect to the known art, but also to obtain a more evenly-distributed smoking and with a greater penetration into the food products with respect to conventional techniques nowadays.

The invention thus conceived is susceptible of numerous modifications and variations, all of which are within the scope of the appended claims.

Figure 5:
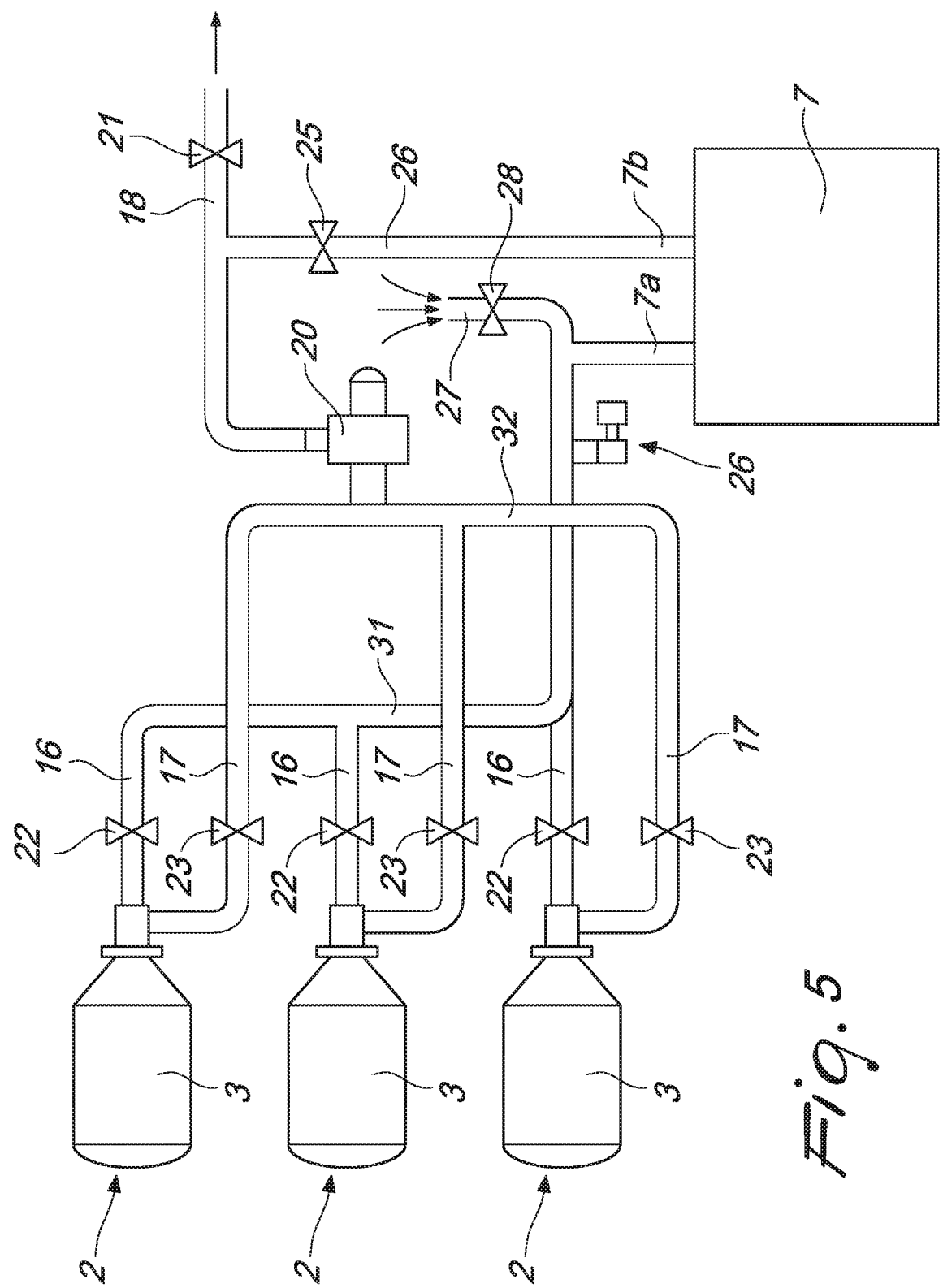
FIG. 5 is a schematic diagram of a possible variation of embodiment of the apparatus according to the invention.

Thus, for example, as shown in FIG. 5, the apparatus according to the invention can comprise, optionally, multiple kilns 2, each one provided with a respective drum 3, the treatment chamber 4 of which is connected to the smoke generator device 7. In this case, the intake ducts 12 of the drums 3 of the kiln 2 are connected to respective delivery ducts 16, which in turn are connected, by way of the interposition of respective first flow control valves 22, to the exit connector 7a of the smoke generator device 7 by way of a delivery distributor duct 31, while the outflow ducts 13 of the smoke from the drums 3 of the kilns 2 are connected to respective discharge ducts 17, which are controlled by respective second flow control valves 23 and which converge in a common manifold duct 32 for gathering the smoke which is connected, by way of interposition of the fan 20, with the evacuation duct 18.

Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102019000002207 from which this application claims priority are incorporated herein by reference.

The invention claimed is:

1. A method for smoking food products, comprising the steps of:
    providing at least one kiln with a rotatable drum having a treatment chamber,
    loading the food products to be smoked into the treatment chamber,
    making the drum of said kiln rotate,
    introducing smoke into said treatment chamber of the drum of said kiln while said drum is rotated with the food products loaded in said treatment chamber,
    evacuating, after a preset time, the smoke from said treatment chamber of the drum of said kiln to fully evacuate the smoke from said treatment chamber
    after the step of evacuating the smoke from said treatment chamber, creating a vacuum in said treatment chamber with the food products loaded in said treatment chamber, and
    unloading the smoked food products from the treatment chamber of the drum of said kiln.

2. The method according to claim 1, further comprising regulating a flow of said smoke.

3. The method according to claim 1, further comprising arranging an axis of extension of said drum horizontally.

4. The method according to claim 1, further comprising damping said smoke with a steam injection device.

5. The method according to claim 1, wherein the step of evacuating the smoke comprises sending air into said treatment chamber.

6. The method according to claim 1, further comprising changing an axis of extension of said drum in a selected angular position during the step of evacuating the smoke.

\* \* \* \* \*

UNITED STATES PATENT AND TRADEMARK OFFICE
CERTIFICATE OF CORRECTION

| | | |
|---|---|---|
| PATENT NO. | : 11,653,658 B2 | Page 1 of 1 |
| APPLICATION NO. | : 16/790096 | |
| DATED | : May 23, 2023 | |
| INVENTOR(S) | : Giovanni Bolzacchini | |

It is certified that error appears in the above-identified patent and that said Letters Patent is hereby corrected as shown below:

On the Title Page

Item (73) should read:
INOX MECCANICA S.P.A., Goito (IT);
LANDWEHR SERVICE GMBH, Versmold (DE)

Signed and Sealed this
Sixteenth Day of September, 2025

Coke Morgan Stewart
*Acting Director of the United States Patent and Trademark Office*